United States Patent [19]

Pavlin et al.

[11] Patent Number: 4,798,461

[45] Date of Patent: Jan. 17, 1989

[54] SYSTEM FOR MONITORING THE GEOMETRY OF A MECHANICAL STRUCTURE

[75] Inventors: Cyrille F. Pavlin, Septeuil; Marc Prevost, Saint Maurice, both of France

[73] Assignee: Bertin & Cie., Plaisir, France

[21] Appl. No.: 34,426

[22] PCT Filed: Jul. 8, 1986

[86] PCT No.: PCT/FR86/00246

§ 371 Date: Mar. 6, 1987

§ 102(e) Date: Mar. 6, 1987

[87] PCT Pub. No.: WO87/00268

PCT Pub. Date: Jan. 15, 1987

[30] Foreign Application Priority Data

Jul. 8, 1985 [FR] France .................. 85 10435

[51] Int. Cl.⁴ .................. G01D 11/16; G01D 11/27; G01D 5/00
[52] U.S. Cl. .................. 356/138; 356/152; 356/372; 356/400; 73/800
[58] Field of Search .......... 356/399, 400, 372, 152, 356/138, 34, 253; 73/800

[56] References Cited

U.S. PATENT DOCUMENTS

| | | | |
|---|---|---|---|
| 3,267,794 | 8/1966 | Howe | 356/399 X |
| 3,684,383 | 8/1972 | Johansson | 356/138 X |
| 4,471,447 | 9/1984 | Williams et al. | 356/138 X |

FOREIGN PATENT DOCUMENTS

| | | | |
|---|---|---|---|
| 0067531 | 12/1982 | European Pat. Off. | |
| 2082173 | 12/1971 | France | |
| 0104701 | 8/1980 | Japan | 356/372 |
| 0015803 | 1/1984 | Japan | 356/400 |
| 0095311 | 5/1985 | Japan | 356/372 |
| 0953457 | 8/1982 | U.S.S.R. | 356/152 |
| 2021261 | 11/1979 | United Kingdom | |
| 2117511 | 10/1983 | United Kingdom | |
| 2128324 | 4/1984 | United Kingdom | |
| 81/02782 | 10/1981 | World Int. Prop. O. | 356/152 |
| 2082173 | 12/1984 | World Int. Prop. O. | |

Primary Examiner—Richard A. Rosenberger
Attorney, Agent, or Firm—Dennison, Meserole, Pollack & Scheiner

[57] ABSTRACT

A system for monitoring the geometry of a mechanical structure comprising a plurality of interconnected rigid elements by means of an optical skeleton (A, B, C) constituted by a light beam (24) running along the elements (10, 12, 14) of the structure, together with photodetector means (28, 32, 36, 40, 42, 46) which are associated with the elements of the structure and towards which fractions of the light beam (24) are directed. The invention is applicable to moving structures such as robots or manipulator arms, as well as to fixed structures.

13 Claims, 2 Drawing Sheets

SYSTEM FOR MONITORING THE GEOMETRY OF A MECHANICAL STRUCTURE

TECHNICAL FIELD

The invention relates to a system for monitoring the geometry of a mechanical structure comprising interconnected rigid elements, the invention being applicable both to fixed structures whose deformations need to be observed and to structures including moving elements capable of servocontrolled displacements, such as robots or manipulator arms.

Such robots are presently being used more and more in factories for fabrication or assembly purposes in order to perform repetitive tasks which may be relatively complex. They generally comprise a plurality of elements mounted one after the other and capable of being displaced relative to one another in rotation or in translation so that a load or a tool carried by the last element of the robot can be displaced from one predetermined point to another, with the various elements of the robot being provided for this purpose with motors and displacement sensors connected to a data processing system in which the movements to be performed have been programmed.

In order to maintain accuracy, the load which a robot can carry is generally a small fraction of its own weight, typically about 1/20-th, since otherwise the various elements of the robot are subjected, as they move, to bending and twisting deformations which vary as a function of the nature and the size of the load carried by the last element, and also as a function of the positions of the various elements relative to one another.

PRIOR ART

It is already known that such robots can be subjected to repetitive tests in the laboratory or during commissioning in order to determine the difference between the rear position of the load carried by the last element when the robot is in a given configuration, and the theoretical position of the load (i.e. the position which would be occupied if the elements were not deformed), and to attempt to eliminate said difference by modifying the positions actually occupied by the various elements of the robot.

However, such tests and adjustments must be performed all over again whenever the nature, the size, or the displacement of the load are modified.

At present, there exists no system capable of detecting and measuring on a permanent basis the deformation of the elements of a robot regardless of the motion of the robot and the size and nature of the load, and capable of taking account of such deformations in order to correct the position of the load and to eliminate its offset relative to a theoretical position.

DESCRIPTION OF THE INVENTION

The invention seeks to fill this gap and provides a system enabling the above-indicated aim to be achieved.

The invention also provides a system of this type capable of detecting and measuring on a permanent basis the deformations of the elements of a fixed structure, in particular when the location of said structure makes access thereto difficult or dangerous, or else when conventional surveillance means in common use cannot be implemented.

To this end, the invention provides a system for monitoring the geometry of a mechanical structure comprising a plurality of interconnected rigid elements, characterized in that the system comprises means for detecting and measuring on a permanent basis the deformations of said elements by means of an "optical skeleton" formed by segments associated with the elements of the structure, with each segment being constituted by a light beam running along the corresponding element at least between its junctions with the adjacent elements, together with photodetector means associated with each element and towards which at least a fraction of the corresponding light beam is directed.

Each light beam is preferably adjusted to run along the axis of the corresponding element of the structure when said element is not subjected to any external load or stress, and to encounter photo-detector means which are associated in fixed manner to said element. Any subsequent deformation of the element causes the point of impact of the light beam on the photodetector means to move, thereby enabling said displacement to be measured and enabling the deformation(s) of the element to be determined.

Preferably, the photo-detector means are targets or two-dimensional photoelectric elements for measuring the offset of the beam impact point relative to a reference point, which may be the center thereof.

Advantageously, another fraction of the light beam running along an element of the structure is directed towards an adjacent element of said structure to form the corresponding segment of the optical skeleton.

In this case, the system may comprise a single light source which generates the above-mentioned light beam and which is disposed, for example, at a fixed point at one end of the structure, together with optical junction means between the elements for providing continuity of the light beam from one element of the structure to the next.

These optical junction means may be constituted by mirrors and/or optical fibers.

Further, at least one element of the structure comprises two segments of the optical skeleton which are oriented in opposite directions from each other and each of which is directed towards photodetector means associated with said element.

It is thus possible to determine and distinguish between the various deformations to which said element is subject.

According to yet another characteristic of the invention, the above-specified photodetector means are connected to data processing means for determining the deformation of the structure as a whole or the displacement of at least one particular point thereon.

It is thus possible to observe changes in the deformations of a fixed structure.

When the structure includes moving elements capable of controlled displacements relative to one another and when the last element is to be positioned accurately relative to the first or relative to a fixed support (as for a robot or a manipulator arm, for example), the above-specified data processing means take account of the measured deformations of the elements of the structure in order to control displacement of at least one of the above-specified moving elements so as to compensate for any position or orientation error of the last element.

The invention can thus improve the accuracy of a robot or a manipulator arm by a factor lying in the range 10 to 100, while simultaneously enabling the weight thereof to be reduced.

The weight of a robot or a manipulator arm is inversely proportional to the desired accuracy and proportional to $L^n$, where L is the sum of the lengths of the elements constituting said robot or said arm and n is about 3.5. As a result, if accuracy is to be improved by a factor of 10, the weight of the robot or the manipulator arm must be multiplied by 10, and if the total length of the elements is increased by 50%, the weight is multiplied by a factor of about 4. The invention which enables the various deformations of the elements of the robot or the arm to be measured and taken into account on a permanent basis thus makes it possible to escape from these constraints and to improve accuracy while reducing weight.

BRIEF DESCRIPTION OF THE DRAWINGS

In the following description, given by way of example, reference is made to the accompanying drawings, in which.

METHODS OF PERFORMING THE INVENTION

Figure 1:
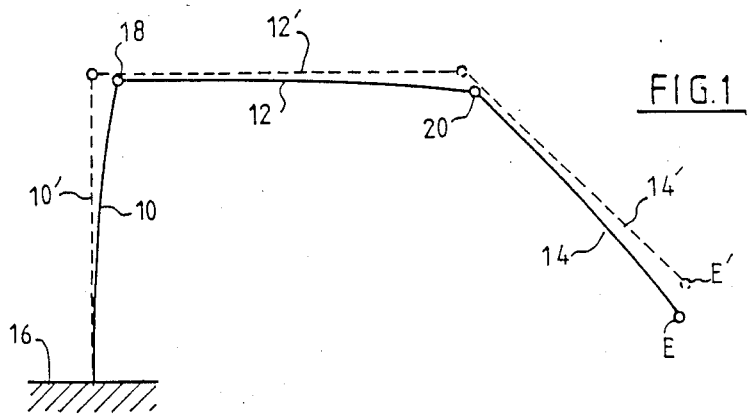
FIG. 1 is a diagrammatic view of a manipulator arm comprising three elements, and showing the deformations of said elements.

FIG. 1 is a highly diagrammatic representation of a three-element manipulator arm having elements 10, 12, and 14: the first element 10 is fixed at one end to a fixed support 16 which is substantially undeformable; the second element 12 is mounted at one end to pivot about an axis 18 fixed on the opposite end of the first element 10; and the third element 14 is mounted at one end to pivot about an axis 20 on the other end of the element 12; with the free end of the third element 14 being intended to carry a load or a tool which is to be displaced from one predetermined point to another by rotation of the elements 12 and 14 about the respective axes 18 and 20.

Dashed lines 10', 12', and 14' show the positions which the elements 10, 12, and 14 would occupy if there was no load, whereas solid lines 10, 12, and 14 show the positions which these elements actually occupy because of the bending and twisting deformations to which they are subjected when loaded. There is thus an error between the position which is actually occupied by the free end E of the third element 14 and the theoretical position E' which said free end would occupy if the arm carried no load. This error is constituted not only by the distance between the point E and E', but also by the angle formed between the straight line 14' and the tangent to the curved segment 14 at its end E. In order to eliminate or at least reduce said error and thus improve the accuracy of the arm, it is necessary to control pivoting of the element 12 about the axis 18 and pivoting of the element 14 about the axis 20 so as to move the point E into the immediate vicinity of the point E', and also so as to reduce or eliminate the angle between the segment 14' and the tangent to the segment 14 at its end E.

These adjustments must be started over each time the nature or the size of the load carried by the third element 14 changes and each time the path of the load is modified. Since the moving elements 12 and 14 of the arm are equipped with displacement motors and with displacement sensors which are connected to a data processing system, e.g. a computer, in which the movements to be performed are programmed, it will be understood that such adjustments are rather difficult, take a long time, and are particularly unsuitable for being performed in an industrial environment.

Figure 2:
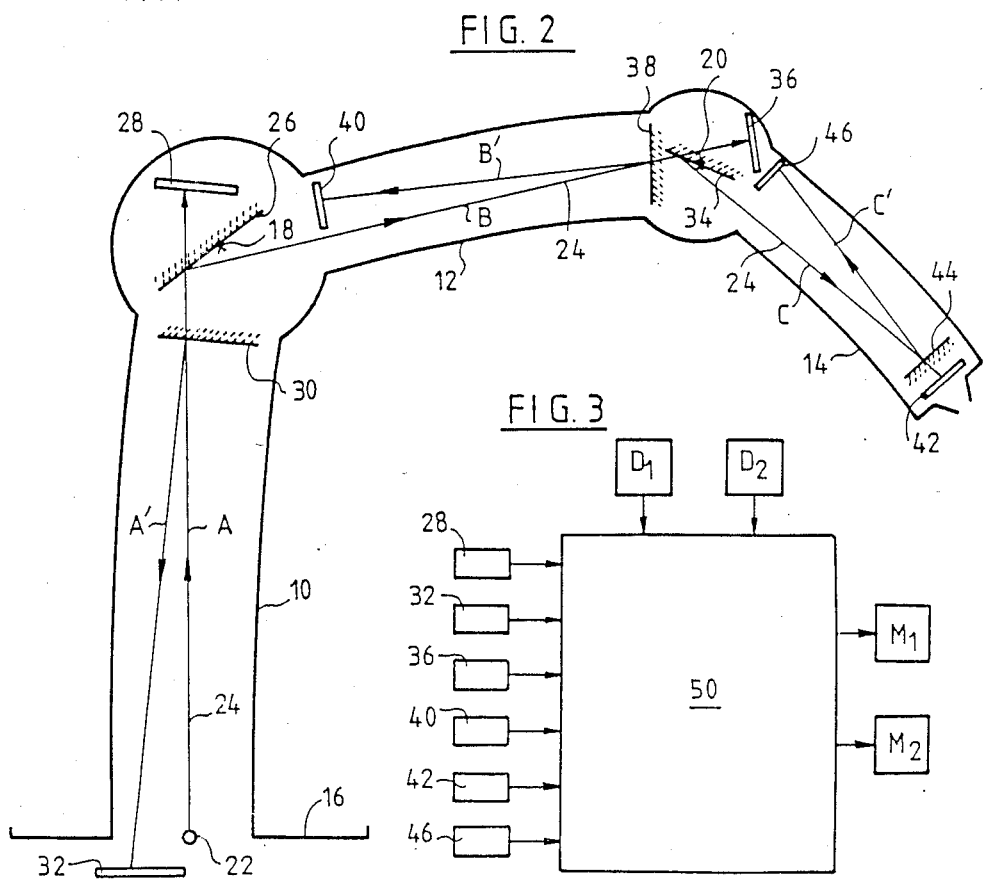
FIG. 2 is a diagram of a three-element manipulator arm equipped with a system in accordance with the invention.

Reference is now made to FIG. 2 showing a three-element manipulator arm which includes a monitoring system in accordance with the invention.

The three elements of the arm and the pivot axes are designated by the same references 10, 12, 14, 18, and 20 as in FIG. 1. The elements 10, 12, and 14 are tubular, thereby enabling the monitoring system in accordance with the invention to be housed therein and protected thereby.

The end of the first element 10 which is fixed to the fixed frame or base 16 is fitted with a light source 22 emitting a light beam 24 (advantageously a beam of coherent light) towards the opposite end of the first element 10, said light beam coinciding with the axis of the element 10 and encountering the pivot axis 18 of the second element 12 when the first element 10 is subjected to no deformation. A mirror 26 passing through the axis 18 reflects at least a fraction of the light beam 24 along the axis of the element 12 towards the pivot axis 20 of the third element 14 and allows a fraction of the light beam 24 to pass towards photodetector means 28 which may be constituted by a two-dimensional set of photoelectric cells suitable for measuring the error between the center of said set and the point of impact of the light beam. Said photodetector means 28 are associated in fixed manner with the end of the element 10. Another mirror 30 which is fixed to the top end of the first element 10 is interposed between the light source 22 and the mirror 26 and is designed so as to pass a fraction of the light beam 24 emitted by said source towards the mirror 26 and so as to reflect the other fraction of said light beam towards photodetector means 32 of the same type as the means 28 and fixed to the bottom end of the first element 10.

Likewise, a mirror 34 is disposed at the junction between the elements 12 and 14 and passes through the pivot axis 20, with photodetector means 36 of the same type as the preceding photodetector means being associated in fixed manner with the second end of the second element 12, a mirror 38 of the same type as the mirror 30 being associated in fixed manner with the second end of the element 12, and photo-detector means 40 of the same type as the preceding means being associated in fixed manner with the first end of the element 12. Thus, a fraction of the light beam 24 reflected by the mirror 26 is reflected by the mirror 28 towards the photodetector means 40, and the other fraction of the light beam reaches the mirror 34 which passes a portion thereof to the photodetector means 36 and which reflect the remaining portion towards photodetector means 42 fixed to the free end of the third element 14, with a mirror 44 of the same type as the mirrors 30 and 38 being likewise fixed to said free end and being interposed on the path of the light beam directed towards the photodetector means 42 in order to return a fraction of said beam to photodetector means 46 fixed to the first end of the element 14.

An "optical skeleton" is thus constituted for the manipulator arm, with said optical skeleton being formed by segments A, B, and C which are associated with the elements 10, 12, and 14 respectively, with each segment running along an associated element between the ends thereof and coinciding with the axis of said element in the total absence of any deformation. Further each segment A, B and C is associated with a respective segment A', B', and C' extending in the opposite direction and impinging on the center of an associated respective photodetector means 32, 40, and 46 in the absence of any deformation of the elements 10, 12, and 14 caused by a load.

The mirrors 26, 30, 34, 38, and 44 are shown as being in the form of semi-transparent mirrors in order to make their functions easier to understand. The mirrors 26 and 34 which form the optical junction means between the elements A, B, and C of the optical skeleton are servo-controlled to the pivoting of the elements 12 and 14 respectively, that is to say the mirror 26 pivots about the axis 18 to an angle a while the element 12 pivots about the same axis through an angle equal to 2a, and the same is true for the mirror 34 and the element 14. These mirrors, together with the mirrors 30, 38, and 44 may be replaced by optical fibers which perform the same functions.

The system is initially adjusted in such a manner that, in the absence of any load deforming the elements 10, 12, and 14, the segments A, B, and C of the optical skeleton coincide with the axes of the elements 10, 12, and 14, and the light beam fractions all reach the photodetector means 28, 32, 36, 40, 42, and 46 in the centers thereof. Once this initial adjustment has been performed, any deformation of the arm gives rise to an error between the point of impact of a fraction of the beam and the center of the associated photodetector means at the end of the element.

In the example shown in FIG. 2, four data items (two data items per photodetector means) are thus obtained for each element 10, 12, and 14. If a greater number of data items needs to be obtained, additional photodetector means are associated with the corresponding element of the manipulator arm and an additional segment of the optical skeleton is directed on said additional means, said additional segment of the optical skeleton being formed from the light beam 24 emitted by the source 22 or being formed by another light beam emitted from said source.

Figure 3:
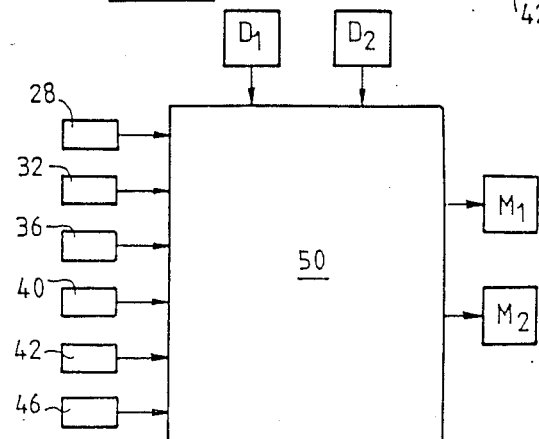
FIG. 3 is a diagram of means for controlling said arm.

The data items obtained in this way on the deformations of the elements 10, 12, and 14 are processed by means of the data processing system shown in FIG. 3 which comprises data processing means 50, having various inputs connected to the outputs from the photodetector means 28, 32, 36, 40, 42, and 46 respectively, and having various other inputs connected to displacement sensors D1 and D2 for measuring the respective rotations of the element 12 about the axis 18 and the element 14 about the axis 20, and with two outputs which are connected to the pivot motors M1 and M2 for pivoting the elements 12 and 14 about the axes 18 and 20 respectively.

The measurements provided by the photodetector means and the measurements provided by the displacement sensors D1 and D2 are taken into account by the data processing means 50 which use these measurements to generate control signals which are applied to the motors M1 and M2 in such a manner as to ensure that the free end of the last element 14 of the manipulator arm is brought to the theoretical position which it ought to occupy and the desired angular orientation, regardless of the size or the nature of the load being transported.

By virtue of the continuous measurement and taking into account of the various deformations of the elements of the manipulator arm, it is possible to continuously correct the error in the position of the end of the arm from its theoretical position as the arm moves, and thus to cause a transported load to follow a trajectory which coincides throughout its length with a theoretical trajectory.

Figure 4:
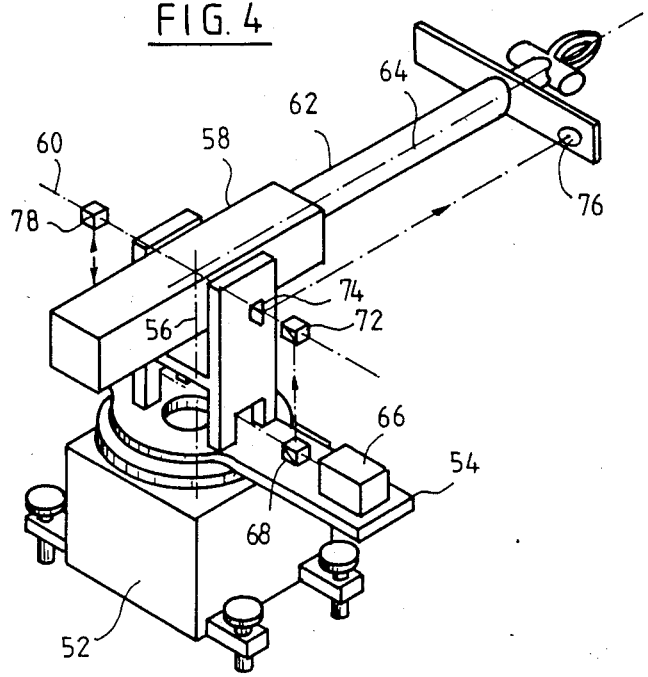
FIGS. 4 and 5 are diagrams of another embodiment of the invention.
Figure 5:
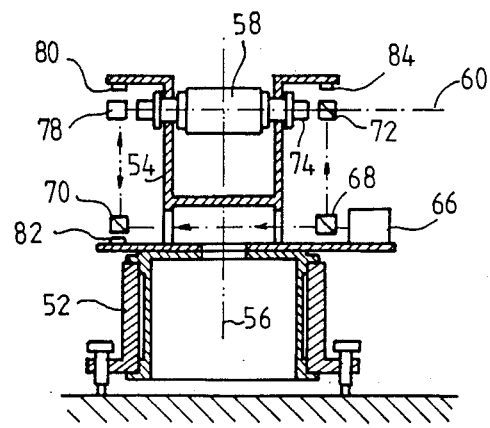

Reference is now made to FIGS. 4 and 5 which show another embodiment of the invention.

The manipulator arm shown in these figures comprises a frame or base 52 on which a first element 54 of the arm is mounted to rotate about a vertical axis 56. The second element 58 of the arm is mounted to rotate about a horizontal axis 60 at the top end of the first element 54, and the third element 62 is carried by the second element 58 and is displaceable in translation along the longitudinal axis 64 thereof, perpendicularly to the axis 60.

The system in accordance with the invention comprises a source 66 of coherent light carried by the base of the first element 54 and emitting a horizontal light beam of circular section with uniform energy distribution, which beam encounters the vertical axis 56. A first mirror 68 fixed on the base of the element 54 allows a fraction of the beam to pass horizontally towards a second mirror 70 also mounted on the base of the element 54, and reflects another fraction vertically towards a third mirror 72 fixed to the top end of the element 54 and placed on the axis of rotation 60, with a fourth mirror 74 being fixed to the second element 58. The mirrors 72 and 74 are inclined at 45° to the axis of rotation 60. The mirror 74 receives the fraction of the light beam which is reflected by the mirror 72 along the axis 60 and reflects it towards photosensitive means 76 fixed to the third element.

The combination of mirrors 72 and 74 replaces both the mirror 26 shown in FIG. 1 and its servo-control means for providing a stepdown ratio of ½ relative to the rotation of the second element, thereby considerably simplifying the structure of the system in accordance with the invention. When the first element 54 is deformed, the light beam reflected between the mirrors 72 and 74 no longer passes exactly along the axis of rotation 60 and describes a circular movement about said axis, with said displacement being measurable by the photosensitive means 76.

Further, and in particular for enabling twisting of the element 54 about its axis to be measured, the second mirror 70 reflects the light beam which it receives from mirror 68 towards the mirror 78 fixed on the top of the first element 54. The mirror 78 allows a fraction of the beam to pass towards photosensitive means 80 fixed at the top end of the first element 54, and reflects another fraction towards photosensitive means 58 fixed at the base of the element 54. The mirror 72 also allows a fraction of the light beam which it receives from the mirror 68 to pass towards photosensitive means 84 fixed to the top end of the element 54.

Thus, two parallel light beams are emitted by the mirrors 68 and 70 on either side of the axis of the element 54 and they encounter third photosensitive means 80, 82, and 84 fixed to said element, thereby enabling six data items to be delivered concerning the deformations of said element (with each photosensitive means measuring the error between its own center and the point of impact of the beam and thereby providing two data items). On the basis of these six data items, it is thus possible to determine all of the deformations corresponding to the six degrees of freedom of the element (three angular deformations and three displacements relative to three perpendicular axes).

Supposing that one deformation is not to be taken into account (e.g. elongation of the element along its longitudinal axis), six data items are obtained for five measurable deformations, thereby providing a redundant data item for verification purposes.

The system in accordance with the invention can be used, as mentioned above, to increase the accuracy with which a robot or a manipulator arm is displaced and positioned by a factor lying in the range 10 to 100.

This system is useful not only during operation of the robot or the manipulator arm, but also when studying and designing said robot or manipulator arm, and makes it possible to considerably lighten the structure thereof while still guaranteeing the desired accuracy by permanently measuring and compensating the deformations of the elements of the structure.

This system also makes it possible to detect and measure the deformations of the bearings by which the elements of the structure are pivotally interconnected. This can be done by associating the mirrors and the photodetector means with the bearings themselves.

The photodetector means may be four-quadrant type photoelectric cells which are capable of measuring a displacement of the point of impact of a light beam by about one micron. For a distance of one meter between the photoelectric cell and the starting point of the light beam, this corresponds to an angular offset of $10^{-6}$ radians. The accuracy of detection and measurement applied to the elements of the structure is thus extremely high.

The invention is also capable of application to complex structures formed by rigid elements which are fixedly interconnected and whose deformations need to be kept under surveillance.

I claim:

1. A system for monitoring the geometry of a mechanical structure comprising a plurality of interconnected rigid elements, said system including means for detecting and measuring on a permanent basis the relative positions of said elements, including for each element first and second light beams directed along each element at least between its junctions with the adjacent element, said first and second light beams being directed in opposite directions, photodetector means associated with each element and positioned to receive at least fractions of said light beams, and means associated with each element for directing a fraction of one of the light beams towards an adjacent element of the structure to constitute the corresponding first light beam of said adjacent element.

2. A system according to claim 1, comprising a single light source generating a first light beam and disposed at a fixed point at one end of the structure, and optical junction means between the elements ensuring continuity of the first light beam from one element to the next element of the structure.

3. A system according to claim 3, wherein the light source emits a beam of coherent light.

4. A system according to claim 3 wherein the optical junction means comprise mirrors.

5. A system according to claim 1, wherein each element of the structure includes a mirror which is fixedly associated therewith and which intercepts at least a fraction of the first light beam and redirect said fraction towards photodetector means fixedly associated with one end of one of said elements, another fraction of the first light beam passing through the mirror towards another photodetector means located at the opposite end of said first element from said first photodetector.

6. A system according to claim 1, wherein the photodetector means are two-dimensional photoelectric elements, for example four-quadrant cells, for measuring the error in the point of impact of the corresponding beam relative to their center.

7. A system according to claim 1, wherein the photodetector means are connected to data processing means for determining the deformation of the structure as a whole or the displacement of at least one selected point thereof.

8. A system according to claim 7, wherein said structure includes elements capable of controlled displacements relative to one another and in which the last element is to be accurately positioned relative to the first element or relative to a fixed support, and wherein said data processing means take account of the measured displacement of each of said elements in order to control the displacement of at least one of said moving elements in order to compensate for any position and orientation error of the last element.

9. A system according to claim 8, wherein displacement sensors and displacement motors connect the moving elements of the structure to said data processing means.

10. A system according to claim 8, wherein at least one optical junction means between two of the elements is constituted by an inclined mirror on the pivot axis and servocontrolled to the relative pivoting between the two elements.

11. A system according to claim 8 wherein two elements pivot relative to each other about an axis and comprise two mirros placed on said axis and oriented at 45° relative to said axis, a first of said mirrors being fixed to a first of said elements and the other mirror being fixed to the other element, the first mirror receiving a light beam running along the first element and reflecting it along the pivot axis towards the other mirror which then reflects it parallel to the axis of the other element.

12. A system according to claim 1, wherein in order to measure twisting of an element about its axis, the system includes means emitting two parallel light beams on either side of the axis of the element, and three photosensitive means fixed to the ends of the element on the paths of said beams.

13. A system according to claim 1 comprising, for each element, means for reflecting a fraction of the first light beam to form the second light beam.

* * * * *